United States Patent [19]

Kurokawa et al.

[11] Patent Number: 5,414,490
[45] Date of Patent: May 9, 1995

[54] PHOTOSENSITIVE MATERIAL EXPOSURE APPARATUS

[75] Inventors: Toshio Kurokawa, Kanagawa; Mitsuru Sawano, Shizuoka; Yukio Osawa, Kanagawa; Kenichi Nakagawa; Mitsuyoshi Ichihashi, both of Shizuoka, all of Japan

[73] Assignee: Fuji Photo Film Co., Ltd., Kanagawa, Japan

[21] Appl. No.: 172,179

[22] Filed: Dec. 23, 1993

[30] Foreign Application Priority Data

Dec. 25, 1992 [JP] Japan .................. 4-357804

[51] Int. Cl.⁶ .............................. G03B 27/72
[52] U.S. Cl. ............................ 355/71; 355/80; 359/55; 359/58
[58] Field of Search ........... 355/71, 80, 81; 359/55, 359/58

[56] References Cited

U.S. PATENT DOCUMENTS

| | | | |
|---|---|---|---|
| 4,025,191 | 5/1977 | Seward | 355/71 |
| 4,745,433 | 5/1988 | Fujimora et al. | 355/71 |
| 4,927,242 | 5/1990 | Aoki et al. | 355/71 |
| 5,105,215 | 4/1992 | Liu | 355/71 |
| 5,274,484 | 12/1993 | Mochizuki et al. | 359/55 |
| 5,353,140 | 10/1994 | Yamazaki et al. | 359/58 |

*Primary Examiner*—Monroe H. Hayes
*Attorney, Agent, or Firm*—Sughrue, Mion, Zinn, Macpeak & Seas

[57] ABSTRACT

To provide a photosensitive material exposure apparatus which is easy for soft focusing exposure. A liquid crystal light regulation member 72 capable of holding light transmission and scattering functions reversibly is disposed between a light source 54 and paper 12. Original image light from a negative film 10 is made to pass through the liquid crystal light regulation member 72, so that the paper 12 is exposed to the light which has passed through the liquid crystal light regulation member 72. The relation of haze (%) with the ratio B/A of the distance B between the liquid crystal light regulation member 72 and the paper 12 to the distance A between the negative film 10 and the paper 12 is represented by B/A<0.3−0.0025 H, preferably, B/A<0.-3−0.0029 H. The light transmission and scattering functions can be held wholly or partly or for every pixel by controlling current conduction to electrodes, so that the liquid crystal light regulation member 72 can be made to serve as a soft focusing filter. A photosensitive material can be subjected to soft focusing exposure easily by electric controlling without mechanical motion.

20 Claims, 6 Drawing Sheets

PHOTOSENSITIVE MATERIAL EXPOSURE APPARATUS

BACKGROUND OF THE INVENTION

The present invention relates to a photosensitive material exposure apparatus by which special image processing such as filtering can be performed easily when the contents of an original image on a photographic film or the like are exposed onto a photosensitive material such as photographic printing paper.

Silver halide photosensitive films are used for photographic films such as color negative films, color reversal films, monochrome negative films, monochrome reversal films, etc. After being used for photographing, these films are brought into photograph shops to be subjected to developing and printing processes. In the past, the films brought into photograph shops were further brought into a large-scale laboratory and subjected to developing and printing processes in the large-scale laboratory. In recent years, however, a small-scale developing system called a "mini-laboratory" has been developed so that developing and printing processes can be carried out in each photograph shop.

By this small-scale developing system, a series of processes of developing a color negative film which is presented by a customer can be carried out in a short time in a photograph shop. These processes include exposing color paper to light from the color negative film and developing the color paper to obtain a print image.

In most cases, the developing of an exposed film and the printing thereof to photographic printing paper are carried out concurrently. Following this first printing, a second printing is often performed. When a second printing is done, the print worker must not only ensure that the specific frame and number of prints ordered by the customer are correct, but he may also have to perform additional processing such as trimming, zooming, soft focusing, lettering, etc. It is important for the print worker to work exactly in accordance with the customer's order.

Conventionally, to generate a soft-focused picture, photographing is performed with a soft focusing filter mounted to a camera. By use of such special effect filters, photographic negative films having various effects are generated, so that effective photographic prints can be obtained from the negative films.

It is, however, difficult to obtain effective photographic prints, unless the photographer mounts such filters intentionally at the time of photographing. Accordingly, it is very difficult to generate special effect prints from negative films, and it requires a great deal of labor and time to finish prints in accordance with the customer's wishes.

As described above, in the case where effective photographic prints are to be obtained, it is required to set processing conditions through filters or the like at the stage of photographing. Accordingly, it is difficult to obtain such a photographic print by applying processing such as soft focusing to an image after selecting the image while observing a negative film or a photographic print. For example, when photographic printing paper is to be subjected to soft focusing and printing, it is required to perform a first exposure for a predetermined time without a soft focusing filter disposed on an optical axis between the original image and the photographic printing paper, and then to perform a second exposure for a predetermined time with a soft focusing filter disposed on the optical axis. Because this work is ordinarily done in a dark room or under a safety lamp, it is difficult to mount/demount the soft focusing filter.

In the case where a different processing filter is used it may also be necessary to identify the kind of filter in a dark room or under a safety lamp. Accordingly, the printing work becomes more troublesome. Although a plurality of filters may be provided in the form of a turret so that the respective filters can be disposed on an optical axis, the apparatus is large-sized and complicated in structure.

When soft-focusing projection exposure is performed by using a conventional filter, color turbidness often occurs on the whole of a photograph because of abnormal scattering of light. For example, in the case of a portrait photograph where a woman is the main subject, the flesh color is often blurred to a not-intended color because of scattering of light in the vicinity thereof.

These phenomena make it difficult to generate soft-focused photographs, though scattering of light in the case of projection exposure from a positive film is reversed compared with scattering of light in the case of projection exposure from a negative film.

An object of the present invention is to solve the aforementioned problems by providing a photosensitive material exposure apparatus which not only enables an image such as a photographic print having an effect such as soft focusing to be produced very easily, but also generates a high-quality photographic print.

SUMMARY OF THE INVENTION

The foregoing object of the present invention is realized by a photosensitive material exposure apparatus which has a liquid crystal light regulation member capable of reversibly holding light transmission and scattering functions on the basis of current conduction control. The liquid crystal member is disposed between a light source for illuminating an original image and a photosensitive material support so that the relation of haze H (%) with the ratio B/A of the distance B between the liquid crystal light regulation member and a photosensitive material to the distance A between the original image and the photosensitive material is represented by B/A<0.3−0.0025 H, preferably, B/A<0.3−0.0029 H.

According to the present invention, image light to the photosensitive material can be scattered by a single operation of controlling current conduction of the liquid crystal light regulation member, since the liquid crystal member is disposed on a light axis between the photosensitive material and the original, to thereby make it possible to apply soft focusing and low contrast processing and to perform soft focusing exposure and low contrast exposure without mechanical motion. Accordingly, because not only processing work can be made easily in a dark room or under a safety lamp but the aforementioned processing is made through current conduction control, various kinds of processing exposure can be made without increase of apparatus size.

DETAILED DESCRIPTION OF THE INVENTION

The apparatus of the present invention contains a liquid crystal light regulation member which is shaped like a sheet in which a liquid is enclosed between a pair of electrodes. By controlling current conduction, not only may the light transmission and scattering functions be produced easily but these functions can be held reversibly. Accordingly, by controlling current conduction of the liquid crystal light regulation member after disposing the liquid crystal light regulation member on an optical axis between an original image and a photosensitive material, image light to the photosensitive material can be scattered easily and regulated without production of any mechanical motion, so that soft focusing can be applied easily. Even in the case of a high-contrast image such as might be picked up on a midsummer beach or the like, the reproduced image can be softened by exposing the photosensitive material to image light scattered by the liquid crystal light regulation member.

Figure 8:
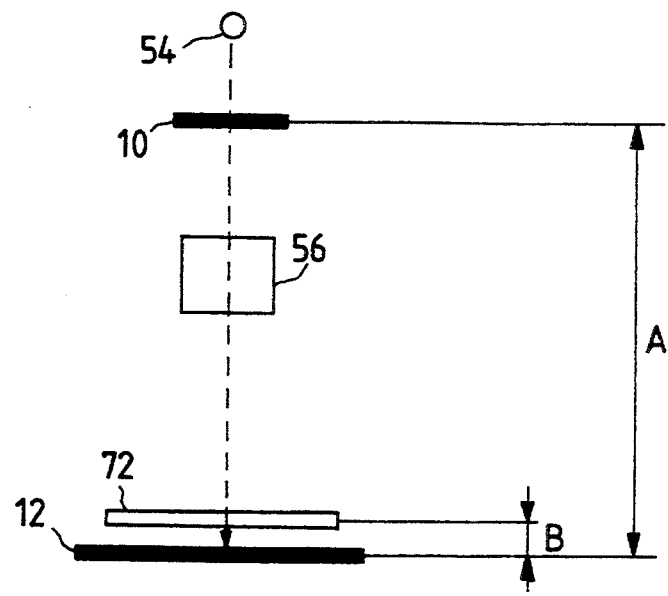
FIG. 8 is a view for explaining the arrangement of the liquid crystal light regulation member.
Figure 9:
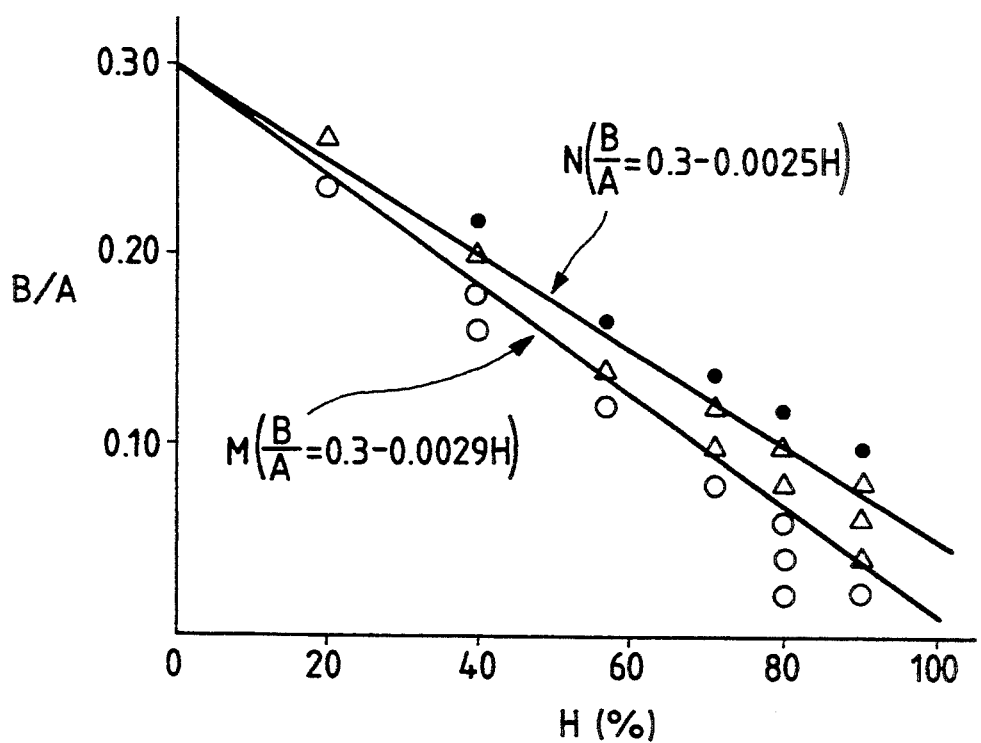
FIG. 9 is a graph showing the relation between the distance ratio B/A of the setting distance B to the image-forming distance A and haze H (%) expressing a state of scattering of light.

As shown in FIGS. 8 and 9, by disposing the liquid crystal light regulation member so that the relation of haze H (%) with the ratio B/A (where B is the setting distance between the liquid crystal light regulation member and the photosensitive material, and A is the image-forming distance between the original image and the photosensitive material) is represented by B/A<0.3−0.0025 H, preferably, B/A<0.3−0.0029 H, the liquid crystal light regulation member enables an effective soft focusing exposure with good color reproduction to be produced. The distance ratio B/A varies according to the haze H of the liquid crystal light regulation member, so that when the distance ratio B/A and the haze H have the aforementioned relation, a good color image can be reproduced because color density at the time of reproduction is not lowered even when the haze percentage is changed.

For example, in the case of a soft focusing exposure where the haze H is 90%, good soft focusing free from lowering of color at the time of reproduction can be applied if exposure is performed where the ratio B/A is lower than 0.075, preferably, lower than 0.039. Assuming that the image-forming distance A in this case is 1000 mm, then good focusing can be applied when the setting distance B is set to be shorter than 75 mm, preferably, shorter than 39 mm.

In the case where a soft-focusing exposure is performed with the haze H set to 80%, good focusing free from lowering of color at the time of reproduction can be applied if the ratio B/A is set lower than 0.1, preferably, lower than 0.068. Assuming that the image-forming distance A in this case is 1000 mm, then good focusing can be applied when the setting distance B is set to be shorter than 100 mm, preferably, shorter than 68 mm.

When the liquid crystal light regulation member is disposed in the aforementioned proportional relation, the distance B between the liquid crystal light regulation member and the photosensitive material is preferably set to be in the range B=1 mm to 50 mm.

When a soft-focusing exposure is performed by using the liquid crystal light regulation member as described above, the phenomenon of color turbidness observed at the time of exposure is remarkably reduced as compared to using a conventional soft focusing filter. This is thought to be due to the fact that the conventional soft focusing filter and the liquid crystal light regulation member according to the present invention are different in light interaction.

A method of exposing a photosensitive material by using a liquid crystal has been described in Japanese Patent Unexamined Publication No. Hei-1-214837. In the method described in that Publication, gradation processing is applied by controlling the quantity of transmitted light in the liquid crystal. That is, in that method, the quantity of image light reached by a specific pixel portion of the photosensitive material is modified to produce color density differences and thereby apply gradation processing. Accordingly, processing by that method cannot include soft processing, which is an object of the present invention. A further difference between that method and the present invention is that the former method uses a shutter for controlling the quantity of transmitted light, so that transmitting and shading states can be set by the shutter.

A distinguishing feature of the present invention is that the liquid crystal light regulation member is able to perform either a light transmission function or a light scattering function. For example, the liquid crystal light regulation member may have properties so that it enters a light transmission mode when a voltage is applied to the member, and so that it enters a light scattering mode when the application of the voltage is released. On the other hand, the liquid crystal light regulation member may have properties so that it enters a light scattering mode when a voltage is applied to the member, and so that it enters a light transmission mode when the application of the voltage is released.

When no image processing is required during an exposure of the photosensitive material performed by using the liquid crystal light regulation member of the present invention, the photosensitive material is exposed by using the liquid crystal light regulation member in a transparent state. When soft focusing is to be applied, the photosensitive material is exposed for a predetermined time during which the liquid crystal light regulation member is in a transparent state and then the photosensitive material is further exposed for a predetermined time during which the liquid crystal light regulation member is in a scattering state.

Examples of the liquid crystal used in the liquid crystal light regulation member in the present invention include polymer dispersion mode liquid crystal, dynamic scattering mode liquid crystal, phase transfer mode liquid crystal, etc.

The polymer dispersion mode liquid crystal has a structure in which nematic liquid crystal drops are wholly or partly enveloped by a polymer matrix. When the liquid crystal and the polymer are combined so that the ordinary ray refractive index of the liquid crystal coincides with the refractive index of the polymer, the liquid crystal is made transparent when an electric field is applied to an element. This transparency occurs because the liquid crystal is oriented in the direction of the electric field to thereby make the refractive index of the liquid crystal coincide with the refractive index of the polymer. On the other hand, light is scattered when no electric field is applied because the liquid crystal is randomly oriented by orientation limiting forces arising from the polymer. Because of this random orientation, the refractive index of the liquid crystal does not coincide with the refractive index of the polymer.

In the liquid crystal light regulation member using the aforementioned polymer dispersion mode liquid crystal, a bright screen is obtained without the necessity of using a polarizing plate. Further, continuous molding in the form of a film can be made, so that the member can be shaped like a cell or the size of the member can be increased easily.

The polymer dispersion mode liquid crystal has various names which depend upon the dispersion mode of the polymer. The following are among those which can be used in the present invention:

NCAP (Nematic Courvilinear Aligned Phase): This is characterized in that the liquid crystal is shaped like a microcapsule and solidified within a resin. (Tradename "UMU" (NIPPON SHEET GLASS Co., Ltd.)) (Japanese Patent Examined Publication No. Hei-3-52843, U.S. patent application Ser. No. 302,780, J.L. Fergason, 1985, SID Dig. Tech. Papers 68 p).

PDLC (Polymer Dispersed Liquid Crystal): This is characterized in that the liquid crystal is formed by using phase separation between the liquid crystal and the polymer. (J.W. Doane et al., Appl. Phys. Lett., 48(4), 269 (1986)).

PNLC (Polymer Network Liquid Crystal): This is characterized in that the polymer matrix is constituted by an ultraviolet ray polymerization compound and has a three-dimensional network structure. (Takeuchi et al., the 15th Liquid Crystal Forum 206 (1989)).

The dynamic scattering mode liquid crystal will now be described. A liquid crystal device called "DSM" (Dynamic Scattering Mode) has been described in "Liquid Crystals Applications And Uses" edited by Vilendla Bahadule, issued by World Scientific Inc., 1990, pp. 195–230, and reference papers therein. The dynamic scattering mode liquid crystal has a structure in which a nematic liquid crystal is nipped between a pair of oriented transparent substrates disposed on transparent electrodes. A liquid crystal compound or composition enclosed therein generally has negative anisotropy of permittivity, slightly low resistivity of about $10^{10}$ Ω per cm or less, and positive anisotropy of conductivity (a difference obtained by subtracting conductivity in the direction perpendicular to the direction of the major axis of the molecule from conductivity in the direction of the major axis of the molecule). Further, generally, an ionic compound (hereinafter referred to as "dopant") is added in the amount of 10 to 1000 ppm.

Among the compounds exhibiting dynamic scattering characteristics, many were known before 1980. For example, Schiff base represented by N-p-methylbenzylidene-p-butylaniline, p-substitution phenyl and p-substitution benzoic ester can be used. All other nematic liquid crystals exhibiting dynamic scattering operation can be used.

Vertical orientation processing and horizontal orientation processing are known as orientation processing for liquid crystal devices. Either of these can be used in the dynamic scattering mode. Accordingly, any orientation processing can be used in the present invention as long as light scattering of the cell in a non-lighting state is very fine so as to be fitted to the object of the present invention. Among those, vertical orientation processing has advantages over other orientation methods because the cell subjected to vertical orientation processing is high in transmittance in a non-lighting state and good in stereosymmetry of light dispersion. Examples of the orientation processing method used include silane coupling agent treatment, polymer coating treatment using polymer such as polyimide, and so on. It is preferable that rubbing is applied if necessary.

Typical examples of the dopant used include quaternary organic ammonium salts such as bromotetrabutyl ammonium. Here, carboxylate may be used as counter anion. Further, charge-transfer complexes represented by tetracyanoquinodimethane (TCNQ) and tetrathiafulvarlene (TTF) can be used.

The dynamic scattering mode liquid crystal can be driven by either DC or AC current, but AC driving current is preferred from the point of view of element life. When AC current is used the preferred frequency and voltage largely depend on the kind, concentration and temperature of each of the liquid crystal compositions and the dopant. One driving method used is a static driving method for driving an element having a structure in which one segment electrode corresponds to one pixel. Another driving method is a multiplex driving method for driving an element having a structure in which one segment electrode is connected to a plurality of pixels. Either of the two driving methods can be adapted to the dynamic scattering mode liquid crystal. The multiplex driving method is advantageous in the case where the number of pixels is not smaller than about 100.

In the case where it is only required to obtain uniform light dispersion over the whole surface of a panel or in the case where it is only required to divide the panel into about 10 parts, the static driving method can be used in the present invention. In some cases it is required that the shape of a portion to be subjected to soft focusing effect is determined arbitrarily, and the number of necessary pixels becomes large because the panel must be divided into a large number of parts so that the soft focused portion can be shaped by a combination of the parts. In this case, the multiplex driving method is required.

When a voltage not higher than a certain value (threshold voltage) is applied to electrodes on a substrate, the dynamic scattering mode liquid crystal does not scatter light transmitted through a layer of the liquid crystal. When a voltage not lower than the threshold voltage is applied, light transmitted through the liquid crystal layer is scattered. The degree of scattering varies according to factors such as liquid crystal material, oriented film generating condition, cell thickness, applied voltage, etc.

Such properties of the dynamic scattering mode liquid crystal are very suitable for the object of the present invention in which a soft focused photograph is to be printed easily from a negative film. That is, light diffusing power is from 5° to 30° as half-value width of an angle, so that it is sufficient for soft-focused printing. Furthermore, the degree of diffusion can be controlled by the applied voltage, so that a system more flexible than a system using a diffusion plate having fixed diffusing power can be produced.

The phase transfer mode liquid crystal will now be described. The phase transfer mode liquid crystal is also called "phase change mode liquid crystal". In the phase transfer mode liquid crystal, the phase change from cholesteric (Ch) phase having molecular orientation of a helical structure to nematic (N) phase of a perpendicular orientation structure or the phase change from N phase to Ch phase is produced in accordance with the intensity of the electric field. In the case where the electric field is weak, Ch phase of a helical structure is selected. In the case where the electric field is strong, the helical structure is released so that the phase is changed to N phase. The Ch phase forms a focal conic tissue to thereby scatter light, whereas the N phase does not scatter light so that the element is made transparent. The phase transfer mode liquid crystal is an element using such electro-optic effect. Because it requires no polarizing plate for utilizing light scattering, a bright element can be obtained. These have been described in the following papers: J.J. Wysocki et al., Phys. Roy. Lett., 20, 1024 (1968); G.H. Hellmeier and L.A. Zanoni, Appl. Phs. Lett., 13, 91 (1968); and H. Malchior et al., Appl. Phys. Lett., 21,392 (1972).

The liquid crystal driving method is roughly classified into static driving method, multiplex driving method and active matrix driving method. Any suitable one of these can be employed in the present invention.

The static driving method is mainly used in the case of a segment electrode structure. Segment electrodes to be displayed are driven individually and simultaneously.

Either segment electrode structure or matrix electrode structure can be employed in the multiplex driving method. In the multiplex driving method using the matrix electrode structure, transparent electrodes are made to interact with each other in the form of an X-Y matrix so that signal voltages are successively applied to respective intersecting points thereof in the manner of time division and further driven by a method called "voltage averaging method".

In the active matrix driving method, a screen is divided into parts of from the order of tens of thousands to the order of hundreds of thousands, and nonlinear elements are incorporated into corresponding pixels so that the operations of the pixels are controlled by using the switching characteristics thereof. The active matrix driving method can use linear elements MOS-FET, TFT, MIN, BTB, RD, pin, and MSI. Any method can be employed in the present invention.

DETAILED DESCRIPTION OF THE PREFERRED EMBODIMENT

An embodiment of the present invention will be described below with reference to the accompanying drawings. The present invention is, however, not limited to the embodiment.

Figure 1:
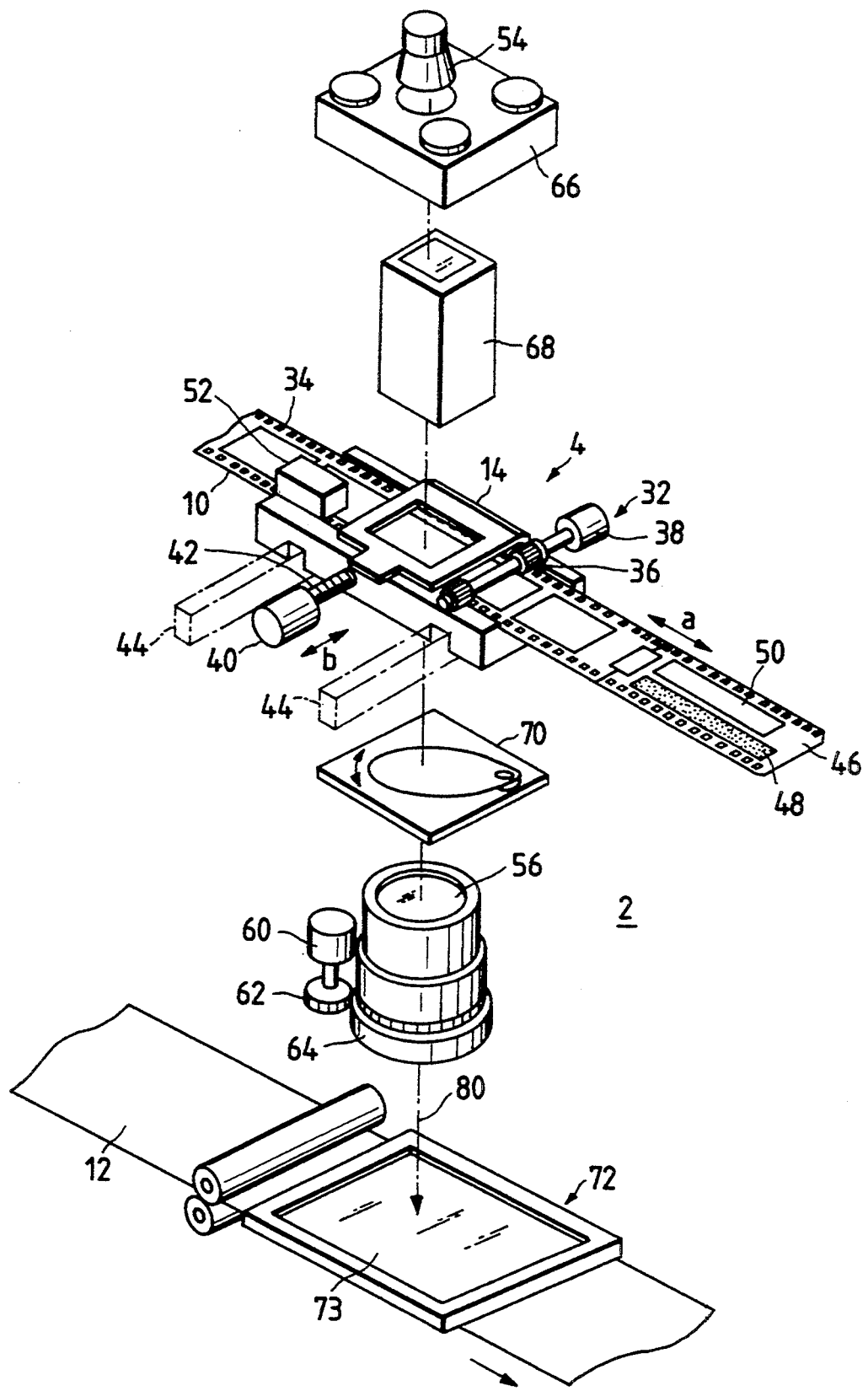
FIG. 1 is a schematic diagram of a printing apparatus.

FIG. 1 is a perspective view typically showing a photographic paper printing apparatus 2 as a photosensitive material exposure apparatus.

A negative film carrier 4 has an exposure window 14 to form an exposure position of a negative film 10. The lower part of the exposure window 14 forms grooves capable of supporting the negative film 10 and capable of transmitting light. The negative film 10 is mounted so as to be nipped between the exposure window 14 and the negative film carrier 4.

The negative film carrier 4 is provided with a film moving means 32 for moving the negative film 10 to dispose a desired frame of the negative film 10 within the exposure window 14. The moving means 32 is constituted by sprockets 36 engaged with perforations 34 of the negative film 10, and a reversible motor 38 for driving the sprockets 36. The negative film 10 is moved in the directions represented by the arrow a by the moving means 32. A screw 42 capable of being rotated by means of a motor 40 is helically fitted to the negative film carrier 4, so that the negative film carrier 4 can be moved in the directions represented by the arrow b through the screw 42 rotated by motor 40.

By the operation of moving the negative film 10 in the directions of the arrow a and the operation of moving the negative film carrier 4 in the directions of the arrow b, the center of an image can be made eccentric to the optical axis so that an image can be trimmed in cooperation with a zooming operation which will be described later.

A leader 46 is joined to a forward end of the negative film 10. The leader 46 is provided with a magnetic tape 48 as an example of an information carrying portion for carrying various kinds of information, and a printing portion 50. The frame number of a frame to be subjected to additional printing, the number of additional prints of the frame, and image processing information such as zooming, trimming, filtering, masking, etc. are magnetically recorded on the magnetic tape 48. Information such as customer name, telephone number, etc. is recorded on the printing portion 50 so that the information can be visually identified by both customer and operator. Alternatively, information may be recorded on a floppy disk or an IC card, instead of the information carrying leader 46.

A read head (shown as a magnetic head in this case) 52 capable of reading the contents of the magnetic tape 48 of the leader joined to the forward end of the negative film 10 is provided on the film-insertion side of the negative film carrier 4. In a process in which the negative film 10 is moved toward the exposure window 14 after the negative film carrier 4 is charged with the negative film 10 from the read head side, information carried on the magnetic tape 48 is read by means of a head 52.

A light source 54 for illuminating the negative film 10 is disposed above the negative film carrier 4. Between the light source 54 and the negative film carrier 4, a three-color cut filter 66 for cutting three colors of Red, Green and Blue is detachably disposed in a light path so that light color balance can be adjusted. Between the cut filter 66 and the negative film carrier 4, a diffuser 68 is disposed to scatter light to thereby obtain uniform light.

Between the negative film carrier 4 and paper (photographic printing paper) 12, a black shutter 70, a lens 56 and a liquid crystal light regulation member 72 are detachably disposed in the light path. The lens 56, the liquid crystal light regulation member 72 and the paper 12 are put within a dark box so as to be shaded. The black shutter 70 cuts off light into the dark box.

The lens 56 has a zooming function. By making a reversible motor 60 drive a gear 62, an outer cylinder 64 engaged with the gear 62 is rotated so that the lens 56 moves along an optical axis 80 to thereby change imaging magnification.

Figure 2:
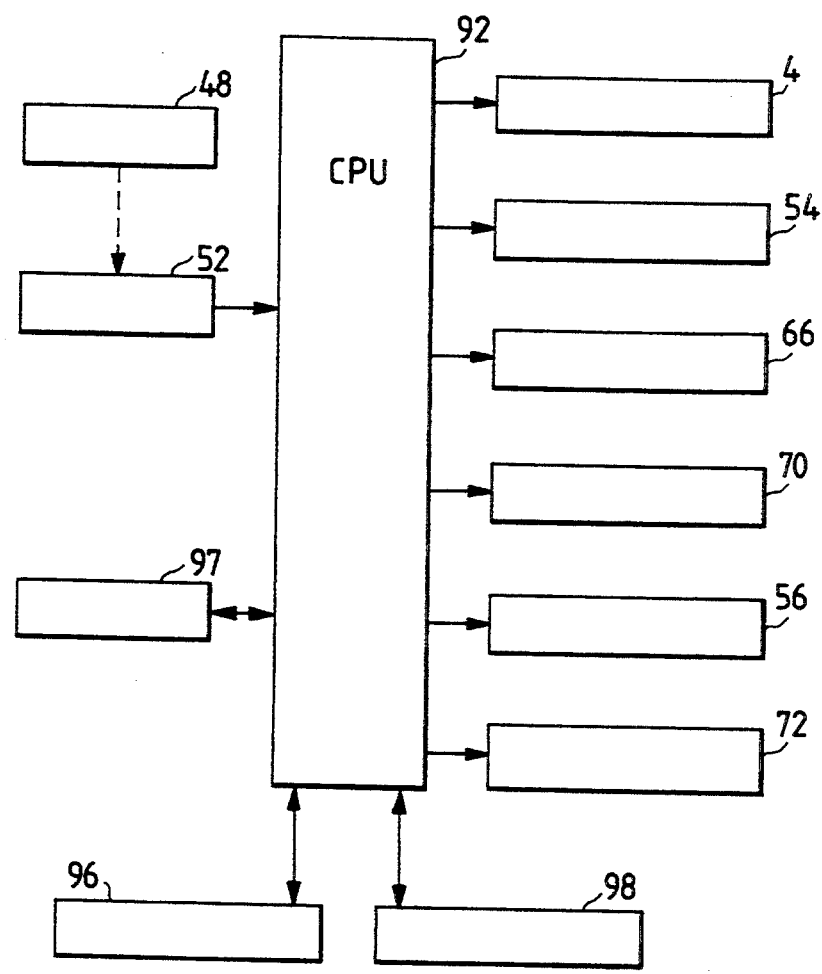
FIG. 2 is a block diagram of a structure for performing printing control.

FIG. 2 is a block diagram of a controller for operating the printing apparatus 2 depicted in FIG. 1.

To a CPU 92, there are connected the read head 52 for reading information carried on the magnetic tape 48, the negative film carrier 4 for disposing a desired frame of the negative film 10 to the exposure window 14, the light source 54 for illuminating the negative film 10, the RGB cut filter 66 for adjusting color balance, the zoom lens 56 for performing image expansion or trimming, the black shutter 70 for optionally cutting off light applied onto the paper 12, the liquid crystal light regulation member 72 functioning as a mask or a filter, and a timer 97 for measuring the time of driving the light source 54, the time of driving the liquid crystal light regulation member 72, or the like. The CPU 92 controls the respective operations of these means. The driving control for the liquid crystal light regulation member 72 will be described later.

To the CPU 92, there are further connected an arithmetic unit 96 for performing an arithmetic operation on the information read by means of the read head 52, and a memory (ROM) 98 for preliminarily storing specific adjustment values and operating procedures in accordance with the set information stored. The CPU 92 performs processing such as zooming, trimming, filtering, masking, etc. on the image of the desired frame by referring to the memory 98 on the basis of the image information read by means of the read head 52 and then drives the light source 54 so that a desired number of photographs can be obtained.

Print control by the CPU 92 will be described below. Various kinds of information recorded in the magnetic tape 48 of the leader 46 joined to the negative film 10 are read by means of the read head 52 and supplied to the CPU 92. The CPU 92 performs desired printing while controlling the operations of the respective means on the basis of the information supplied to the CPU 92.

First, for frame setting, the negative film 10 is conveyed while controlling the operation of the film moving means 32 on the basis of the recorded frame number so that a desired frame is positioned in the exposure window.

Next, for zoom setting, the lens 56 is moved while controlling the operation of the lens driving means 60 on the basis of the recorded zoom information so that the lens 56 moves into a predetermined position.

Next, for setting of the operation of the light source 54, control is performed on the basis of the recorded information concerning the number of prints and the exposure program information so that the light source 54, the liquid crystal light regulation member 72, etc. are operated the corresponding number of times.

For example, to expose a portrait image to the paper 12 in soft focusing, exposure is started while the liquid crystal light regulation member 72 is made transparent, and the exposure is continued for a predetermined period while the liquid crystal light regulation member 72 is controlled at a predetermined point of time so as to be in a light scattering state as if it were a mat-glass-shaped soft focusing filter. The exposure order may be reversed. By changing the time allocation between the transparent state and the scattering state as described above, the degree of soft focusing can be changed.

When an ordinary photograph is required, the ordinary photograph may be obtained by making the liquid crystal light regulation member 72 transparent during the entire exposure period. In the case of two different kinds of prints, printing can be performed by using the same mechanism but changing the control steps. With respect to the same pixel portion in the negative film 10, the exposure area of a portion exposed to image light transmitted through a scattering portion of the liquid crystal light regulation member 72 is enlarged more greatly than the exposure area of a portion exposed to image light not subjected to light regulation, so that an image formed in the portion exposed to image light transmitted through the scattering portion of the liquid crystal light regulation member 72 becomes blurred to thereby obtain a soft focusing effect. Specifically, when a portrait image is subjected to the above-mentioned exposure, not only can soft tones be obtained, but sharp image portions such as the wrinkles of a face can be reproduced in a blurred manner so that such wrinkles can be made unobtrusive.

In the case where the negative film 10 has an image with high contrast such as might result from photographing the image under a large quantity of light at the beach in midsummer, the image can be reproduced as an image softened by exposing the paper 12 to image light scattered by the liquid crystal light regulation member 72.

In the above-mentioned exposing operation, light regulation can be performed simply by current conduction control without any production of mechanical motion, so that the paper 12 can be very easily exposed to the processed image. Furthermore, information concerning the liquid crystal light regulation member 72 such as kind of light regulation, exposure period, etc. can be stored in the magnetic tape 48. Accordingly, the information can be read before the exposure so that a series of exposing operations can be performed in accordance with the thus read information.

Although a sequential flow of printing control has been described above, control of the liquid crystal light regulation member 72 as an important part of the present invention will be described below.

Figure 3:
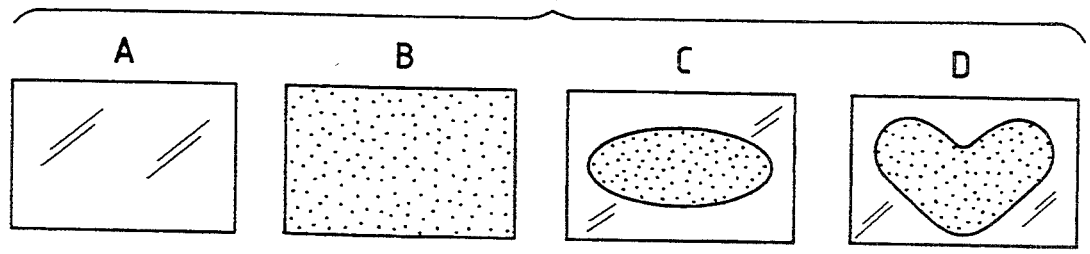
FIG. 3 is a view showing the forms of various light regulation functions of a liquid crystal light regulation member.

FIG. 3 is a view showing various states of the liquid crystal light regulation member 72. In FIG. 3, diagram A shows a state in which the entire surface of the member is transparent; diagram B shows a state in which light is scattered over the entire surface; diagram C shows a state in which the member has a scattering portion shaped like an ellipse and the remaining portion has been made transparent; and diagram D shows a state in which the member has a scattering portion shaped like a heart and the remaining portion has been made transparent. Soft focusing can be applied to the entire surface when exposure is performed by using the entire transparent state shown in diagram A of FIG. 3 and the entire scattering state shown in the diagram B of FIG. 3. Soft focusing can be applied to part of the surface when exposure is performed by using the entire transparent state shown in diagram A of FIG. 3 and the partial scattering state shown in diagram C or diagram D of FIG. 3.

To form patterns of the respective states shown in FIG. 3, an optimum method is selected from among a static driving method, a simple matrix driving method and an active matrix driving method. In the static driving method, electrodes may be formed to have the shapes shown in diagrams A, B, C and D. In the simple matrix driving method, not only can the patterns shown in diagrams A and B be formed but rectangular patterns having pixels arranged crosswise can also be formed. In the active matrix driving method, all patterns shown in diagrams A, B, C and D as well as other arbitrary patterns can be formed.

Figure 4:
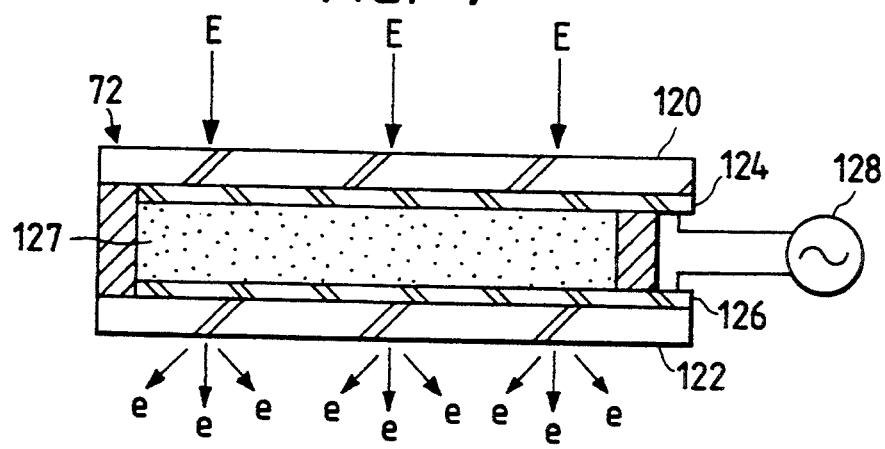
FIG. 4 is a sectional view of a liquid crystal light regulation member.
Figure 5:
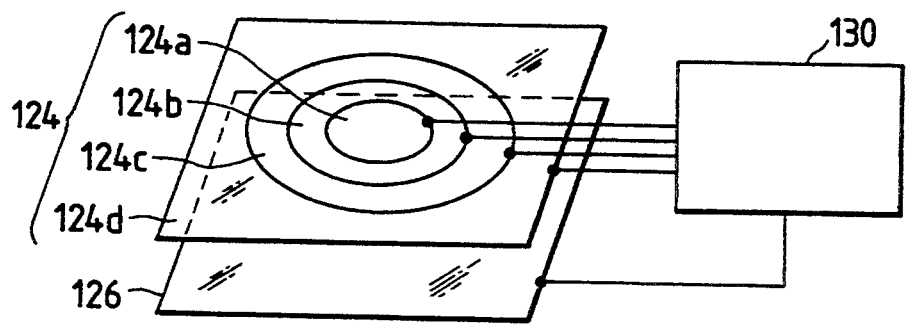
FIG. 5 is a conceptual view of an electrode structure based on static driving.

The structure of the liquid crystal light regulation member 72 using the static driving method will be described below with reference to FIGS. 4 and 5. FIG. 4 is a sectional view of the liquid crystal light regulation member 72. FIG. 5 is a conceptual view of electrode configuration. FIG. 4 shows a situation in which image light E is changed to scattered light e after passing through the scattering-state portion of the liquid crystal light regulation member 72.

The liquid crystal light regulation member 72 has a structure in which a liquid crystal 127 is enclosed between a pair of transparent electrodes 124 and 126 disposed between a pair of transparent substrates 120 and 122. A voltage from an electric source 128 is applied between the pair of electrodes 124 and 126, so that the voltage-applied portion changes to a transparent or scattering state in accordance with the quality of the liquid crystal 127. Of the pair of electrodes 124 and 126, one is a segment electrode 124 and the other is a common electrode 126.

In the embodiment shown in FIG. 5, a circular segment electrode 124a is formed in the center and two annular segment electrodes 124b and 124c and the other segment electrode 124d are formed successively around the electrode 124a. The respective electrodes 124a, 124b, 124c and 124d are connected to a driving circuit 130. The common electrode 126 is also connected to the driving circuit 130. By supplying a voltage to one or more suitable electrodes selected from the segment electrodes 124a, 124b, 124c and 124d, the shape of the scattering portion can be changed.

When, for example, a dynamic scattering mode (DSM) liquid crystal is enclosed, the liquid crystal is ordinarily transparent but light is scattered in a voltage-applied portion. Accordingly, the size of the circular scattering portion can be set by variously selecting the segment electrodes 124a, 124b and 124c suitably and applying voltages thereto. Further, if voltages are applied to all the segment electrodes 124a, 124b, 124c and 124d, the whole surface is set to be in a scattering state.

On the other hand, in the case where a polymer dispersion mode liquid crystal (NCAP, PDLC, PNLC, etc. as described above) is enclosed, the liquid crystal is ordinarily in a scattering state but a voltage-applied portion is made transparent. Accordingly, the size of the circular scattering portion can be set variously by selecting the segment electrodes 124a, 124b, 124c and 124d suitably and applying voltages thereto. Further, if there is no voltage applied to any of the segment electrodes 124a, 124b, 124c and 124d, the whole surface is set to be in a scattering state. If voltages are applied to all the segment electrodes, the whole surface is set to be in a transparent state.

The pattern of the scattering portion having the fixed shape and size as shown in diagram D of FIG. 3 is formed by applying a voltage between one electrode formed to have this shape and used as a fixed pattern electrode and the common electrode.

Further, when the liquid crystal light regulation member 72 is driven by the active matrix method, any one of the states shown in FIG. 3 can be formed by one liquid crystal light regulation member. By driving the liquid crystal light regulation member 72 by the active matrix method to control current conduction to electrodes for respective pixels, various patterns having arbitrary shapes can be formed.

Figure 6:
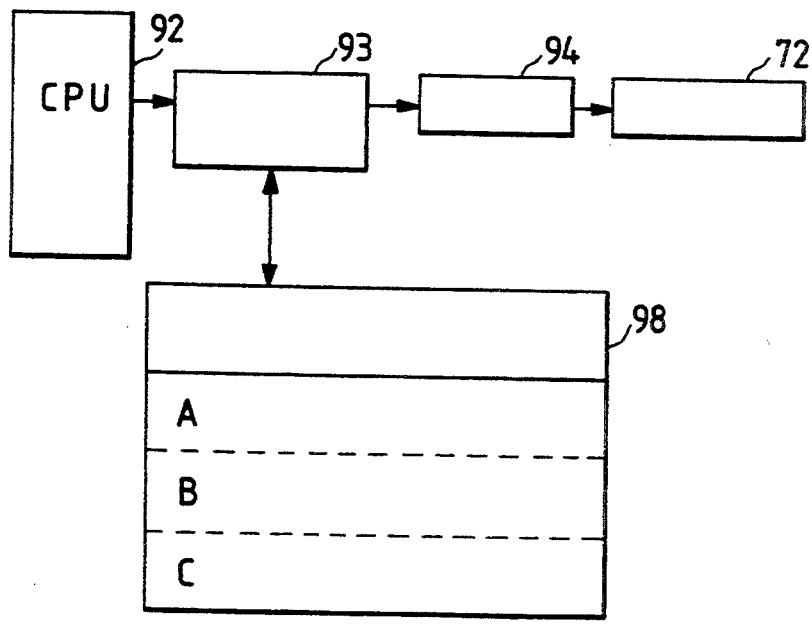
FIG. 6 is a block diagram of a structure for performing driving control of the liquid crystal light regulation member on the basis of static driving.

FIG. 6 is a block diagram illustrating how control is performed of the liquid crystal light regulation member 72 driven by the static driving method shown in FIG. 5. When a processing information signal is supplied from a CPU 92 to a current conduction pattern selection circuit 93, the current conduction pattern selection circuit 93 selects one current conduction pattern from various current conduction patterns stored in a memory 98. For example, current conduction patterns having the respective contents "wholly transparent", "wholly scattering" and "partly scattering" equivalent to the diagrams A to C shown in FIG. 3 are stored in the memory 98 in advance.

As the contents of the current conduction patterns, there are, for example, "pixels to be subjected to current conduction", "voltages to be supplied to the pixels", "voltage application time" and "current conduction switching time". The content of a current conduction pattern selected by the current conduction pattern selection circuit 93 is supplied to a driving circuit 94. The driving circuit 94 drives the liquid crystal light regulation member 72 on the basis of the selected current conduction pattern to thereby form a pattern in the liquid crystal light regulation member in accordance with the selected content.

Figure 7:
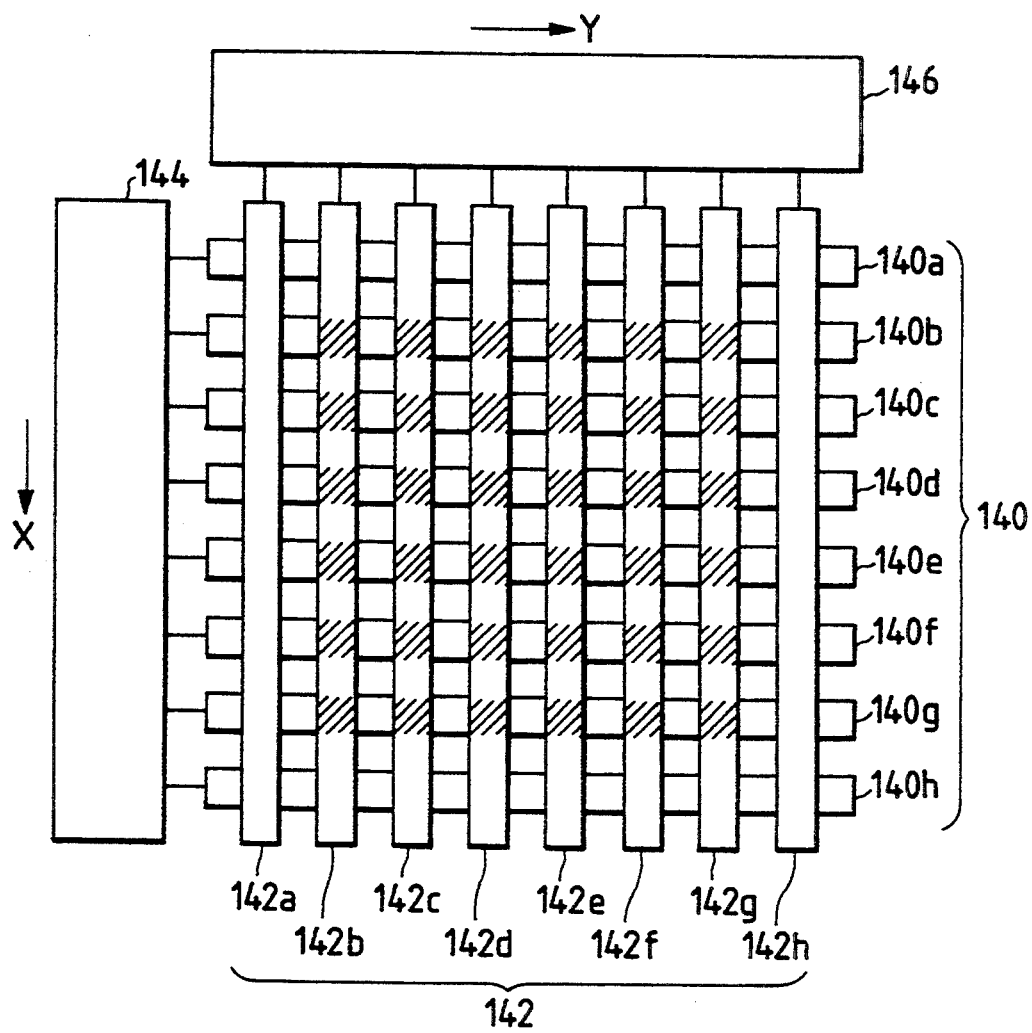
FIG. 7 is a conceptual view of a simple matrix electrode structure.

FIG. 7 is a conceptual diagram of a simple matrix electrode structure illustrating the multiplex driving method which can be used instead of the static driving method. Simple matrix type electrodes are formed so that scanning side electrodes 140 and data side electrodes 142, respectively, extending in X and Y directions so as to be shaped like tanzaku (a strip of fancy paper) are disposed so as to intersect each other on a plane of projection. Each of the intersecting portions between the two kinds of electrodes 140 and 142 forms one pixel of the liquid crystal light regulation member. A liquid crystal is enclosed between the two kinds of electrodes 140 and 142 in the same manner as in the static driving type electrodes shown in FIG. 4.

Driving circuits 144 and 146 are connected to the respective electrodes 140 and 142, so that the respective electrodes 140 and 142 are multiplex-driven. Voltages to be applied to the respective pixels are determined on the basis of potential difference between the scanning side electrodes 140 and the data side electrodes 142. The situation shown in FIG. 7 is a situation in which voltages are applied to the scanning side electrodes 140b, 140c, 140d and 140e and the data side electrodes 142b, 142c, 142d and 142e. In the case where a dynamic scattering mode liquid crystal is enclosed, the portions shaded by diagonal lines are set to be in a scattering state, and the other portions are set to be transparent. On the other hand, in the case where a polymer dispersion mode liquid crystal is enclosed, the portions shaded by diagonal lines are set to be transparent, and the other portions are set to be in a scattering state.

In the simple matrix driving type electrode structure described above, a voltage can be applied for every pixel, so that transparent and shading states can be set for pixels individually. A further advantage of this electrode structure is that a large number of pixels can be driven by a small number of driving circuits.

In the simple matrix driving method, however, a crosstalk phenomenon which lowers the display contrast occurs because when a voltage is applied to a specific pixel, partial voltages are applied to the other pixels. The crosstalk phenomenon can be prevented, however, by the application of voltages on the basis of the voltage averaging method.

Next, the positioning of the liquid crystal light regulation member 72 will be described. FIG. 8 is a view illustrating the positional relations between the light source 54, the negative film 10, the liquid crystal light regulation member 72 and the paper 12. By dispersing the liquid crystal light regulation member 72 so as to be close to the paper 12, the member can be made to serve as a soft focusing filter. The preferred setting position of the liquid crystal light regulation member 72 however is related to the distance between the negative film 10 and the paper 12.

By disposing the liquid crystal light regulation member 72 so that the relation between the ratio B/A and haze H (%) is represented by $B/A < 0.3 - 0.0025 H$, preferably, $B/A < 0.3 - 0.0029 H$, where A is the distance (image-forming distance) between the negative film 10 and the paper 12 and B is the distance (setting distance) between the liquid crystal light regulation member 72 and the paper 12, soft focusing exposure good in color reproduction can be applied, so that the light regulating function can be fulfilled effectively.

The setting distance B is preferably in a range of from 1 mm to 50 mm, in which a preferred exposure effect based on scattering of light can be obtained. When the liquid crystal light regulation member 72 is too close to tile paper 12, the effect of light scattering on exposure is lowered. Accordingly, it is preferable that a slight gap is formed between the liquid crystal light regulation member 72 and the paper 12.

The image-forming distance A is set variously in accordance with the kind of exposure apparatus. Although the image-forming distance A varies according to the kind of apparatus used, light scattering is effectively achieved during the paper exposure if the liquid crystal light regulation member 72 is disposed so that the ratio B/A of the setting distance B to the image-forming distance A is set to be in the above-mentioned range.

FIG. 9 is a graph showing the relation between the distance ratio A/B of the setting distance B to the image-forming distance A and haze H (%) expressing a state of scattering of light. Here, haze H (%) is defined by $H/100 = D/(T+D)$ in which: T represents the linear-propagation light quantity of light perpendicularly transmitted through the liquid crystal portion of the liquid crystal light regulation member, and D represents the quantity of scattered light.

For the symbols of the graph which disclose impressions of some persons, respectively, ● represents a state in which the density of the color on the paper after development is lightened, Δ represents a state in which the density of the color on the paper is lightened in some cases but which poses no problem for practical use, and 0 represents a state in which a color image is reproduced sharply on the paper.

Data for this graph were obtained by an experiment using the following sample and apparatus.

Color negative film: Judgment was made using the face of a person photographed on Fuji Color G100 (35 mm) produced by Fuji Photo Film Co., Ltd.

Color paper: Fuji Color Paper SUPER HG.

Enlarger: A680 produced by Fuji Photo Film Co., Ltd. was used with its stop opened.

Liquid crystal light regulation member: Haze was changed by changing the voltage to be applied to a dynamic scattering mode liquid crystal (DS) panel which was prepared by the steps of: laminating a transparent electrode ITO, an insulating film ($SiO_2$) and an oriented film (formed by applying and baking LX5400 produced by Hitachi Kasei Co., Ltd.) onto each of two 1.1 mm-thick glass substrates; sticking the two glass substrates to each other after putting a 9.5 $\mu$m-diameter rod-like glass space as a spacer therebetween; and vacuum-injecting a liquid crystal (prepared by mixing 0.04% by weight of tetrabutyl ammonium bromide in ZLI-4318 produced by Merck & Co., Inc.) therein at 90° C.

Haze meter: Full automatic direct-reading haze computer SUGA HGM-2DP produced by SUGA TESTER.

As is obvious from the graph of FIG. 9, in the case where soft focusing is performed by using the liquid crystal light regulation member, the situation in which all persons or subjects can recognize the color image on the paper (photographic printing paper) after development is lower than the region shown by the line M. The specific relation between haze H and the distance ratio B/A which makes it possible to recognize a sharp color image is as follows: When haze is 90%, the distance ratio B/A is 0.02. When haze is 80%, the values of the distance ratio B/A are 0.06, 0.04 and 0.02. When haze is 71%, the distance ratio B/A is 0.08. When haze is 56.5%, the distance ratio B/A is 0.12. When haze is 40%, the values of the distance ratio B/A are 0.16 and 0.18. When haze is 20%, the distance ratio B/A is 0.24.

The line M represents the equation $B/A = 0.3 - 0.0029 H$. Accordingly, if the relation $B/A < 0.3 - 0.0029 H$ is satisfied, it is apparent that a sharp color soft focused image can be obtained in the case where soft focusing is performed while changing haze by using the liquid crystal light regulation member.

The preferred distance ratio B/A for soft focusing varies according to the haze percentage of the liquid crystal, so that the preferred distance ratio B/A changes with the change of the haze percentage. For soft focusing exposure to obtain haze of 90%, exposure is performed after the distance ratio B/A is set to be 0.02. As a result, a sharp color soft focused image can be safely formed. In the case of soft focusing exposure to obtain haze of 90%, it is apparent from the equation of the line M that a sharp color soft focused image can be formed if the distance ratio B/A is smaller than 0.039. When, for example, the image-forming distance A is 1000 mm, exposure is performed after the setting distance B is set to be shorter than 39 mm. When, for example, the image-forming distance A is 400 mm, a sharp color soft focused image can be formed if exposure is performed after the setting distance B is set to be shorter than 15.6 mm.

For soft focusing exposure to obtain haze of 80%, exposure is performed after the distance ratio B/A is set to be smaller than 0.06. As a result, a sharp color soft focused image can be formed in the same manner as described above. In the case of soft focusing exposure to obtain haze of 80%, it is apparent from the equation of the line M that a sharp color soft focused image can be formed if the distance ratio B/A is smaller than 0.068. When, for example, the image-forming distance A is 1000 mm, exposure is performed after the setting distance B is set to be shorter than 68 mm. When, for example, the image-forming distance A is 400 mm, a sharp color soft focused image can be formed if exposure is performed after the setting distance B is set to be shorter than 27.2 mm.

Further, if the distance ratio B/A is 0.02, a sharp color soft focused image can be safely formed when haze is lower than 96.6%. If the distance ratio B/A is 0.06, a sharp color soft focused image can be safely formed when haze is lower than 82.8%.

In the region in which B/A is lower than the line M, all the subjects can recognize the color image. Even in the region in which B/A is higher than the line M, there is no problem during practical use because the perception that the color is lightened depends upon the circumstances. Except in the case where no subject can recognize the color image (the region in which B/A is higher than the line N (B/A=0.3-0.0025 H), a soft focused image can be obtained for all practical purposes.

When the liquid crystal light regulation member having the aforementioned structure is incorporated into the printing portion of an automatic paper developing apparatus, it is useful because all the processes from exposure to development can be carried out continuously. When the liquid crystal light regulation member is provided in a single manual type printing apparatus as shown in FIG. 10, it is also useful because image processing work can be performed easily.

Figure 10:
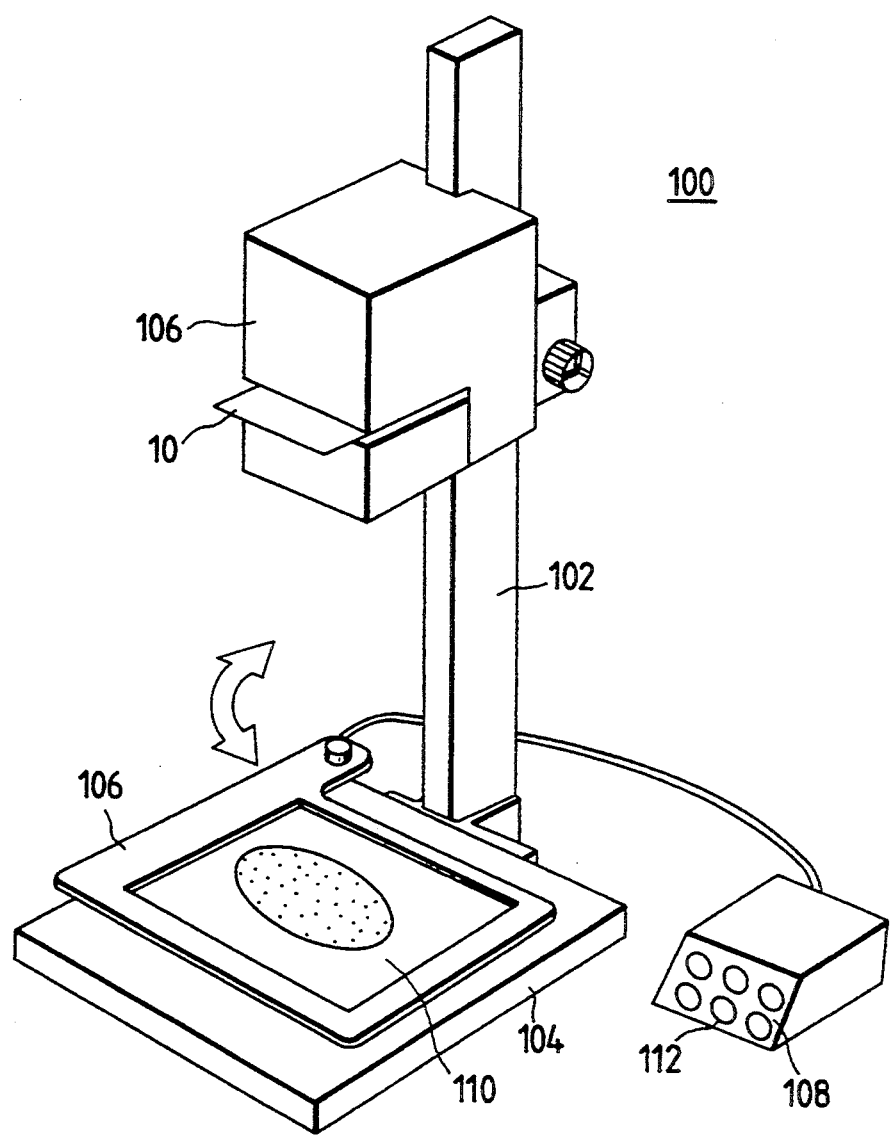
FIG. 10 is a perspective view of a manual type printing apparatus.

The following is a description of the structure of the printing apparatus 100 shown in FIG. 10: An easel 102 extending upward and downward is fixed to a paper support 104, and a film loading portion 106 including a light source is provided so as to be movable upward and downward along the easel 102. A liquid crystal light regulation member 106 is provided on the paper support 104 so as to be rotatable in directions represented by the arrow, so that the condition of the light regulating function of a liquid crystal portion 110 can be controlled by a control portion 108. The control portion 108 has a plurality of setting switches 112 corresponding to various light regulating functions of the liquid crystal portion 73, so that functions of transparency and scattering (partly or wholly) in the liquid crystal portion 110 are produced by selecting the switches 112.

When this printing apparatus 100 is used, an operator puts paper (not shown) on the paper support 104 in a dark room after charging the film 10, positions the liquid crystal light regulation member 106 on the paper and operates the switches 112 of the control portion 108 to set the function of the liquid crystal portion 110. Then, with the liquid crystal light regulation member 106 positioned as predetermined according to the function to be performed, the light source is energized for predetermined periods of time to perform the double exposure of the paper. As a result, soft focusing exposure and low contrast exposure can be performed in the manner described above.

Although embodiments of the present invention have been described above, the photographic photosensitive material and printing photosensitive material which can be used in the present invention are not limited to the aforementioned film and paper respectively. Examples of the photographic photosensitive material include a color reversal film, a color positive film, a monochrome film, etc. Examples of the printing photosensitive material include color reversal paper, monochrome paper, etc.

For example, the printing apparatus in the present invention can be adapted to a large-size or small-size automatic developing apparatus, an apparatus of the type combined with a film processor, and so on.

What is claimed is:

1. A photosensitive material exposure apparatus, characterized in that a liquid crystal light regulation member capable of reversibly holding light transmission and scattering functions on the basis of current conduction control is disposed between a light source for illuminating an original image and a photosensitive material support so that the relation of haze H (%) with the ratio B/A of the distance B between the liquid crystal light regulation member and a photosensitive material to the distance A between the original image and the photosensitive material is represented by $B/A < 0.3 - 0.0025\ H$.

2. A photosensitive material exposure apparatus, characterized in that a liquid crystal light regulation member capable of reversibly holding light transmission and scattering functions on the basis of current conduction control is disposed between a light source for illuminating an original image and a photosensitive material support so that the relation of haze H (%) with the ratio B/A of the distance B between the liquid crystal light regulation member and a photosensitive material to the distance A between the original image and the photosensitive material is represented by $B/A < 0.3 - 0.0029\ H$.

3. A photosensitive material exposure apparatus as claimed in claim 1, wherein said liquid crystal regulation member comprises a polymer dispersion mode liquid crystal.

4. A photosensitive material exposure apparatus as claimed in claim 2, wherein said liquid crystal regulation member comprises a polymer dispersion mode liquid crystal.

5. A photosensitive material exposure apparatus as claimed in claim 1, wherein said liquid crystal regulation member comprises a dynamic scattering mode liquid crystal.

6. A photosensitive material exposure apparatus as claimed in claim 2, wherein said liquid crystal regulation member comprises a dynamic scattering mode liquid crystal.

7. A photosensitive material exposure apparatus as claimed in claim 1, wherein said liquid crystal regulation member comprises a phase transfer mode liquid crystal.

8. A photosensitive material exposure apparatus as claimed in claim 2, wherein said liquid crystal regulation member comprises a phase transfer mode liquid crystal.

9. A photosensitive material exposure apparatus as claimed in claim 3, wherein said polymer dispersion mode liquid crystal comprises a Nematic Courvilinear Aligned Phase liquid crystal.

10. A photosensitive material exposure apparatus as claimed in claim 4, wherein said polymer dispersion mode liquid crystal comprises a Nematic Courvilinear Aligned Phase liquid crystal.

11. A photosensitive material exposure apparatus as claimed in claim 3, wherein said polymer dispersion mode liquid crystal comprises a Polymer Dispersed Liquid Crystal.

12. A photosensitive material exposure apparatus as claimed in claim 4, wherein said polymer dispersion mode liquid crystal comprises a Polymer Dispersed Liquid Crystal.

13. A photosensitive material exposure apparatus as claimed in claim 3, wherein said polymer dispersion mode liquid crystal comprises a Polymer Network Liquid Crystal.

14. A photosensitive material exposure apparatus as claimed in claim 4, wherein said polymer dispersion mode liquid crystal comprises a Polymer Network Liquid Crystal.

15. A photosensitive material exposure apparatus as claimed in claim 1, further comprising static driving means for controlling said liquid crystal regulation member.

16. A photosensitive material exposure apparatus as claimed in claim 2, further comprising static driving means for controlling said liquid crystal regulation member.

17. A photosensitive material exposure apparatus as claimed in claim 1, further comprising a multiplex driving means for controlling said liquid crystal regulation member.

18. A photosensitive material exposure apparatus as claimed in claim 2, further comprising a multiplex driving means for controlling said liquid crystal regulation member.

19. A photosensitive material exposure apparatus as claimed in claim 1, further comprising an active matrix means for controlling said liquid crystal regulation member.

20. A photosensitive material exposure apparatus as claimed in claim 2, further comprising an active matrix means for controlling said liquid crystal regulation member.

* * * * *